United States Patent [19]
Saund et al.

[11] Patent Number: 5,659,766
[45] Date of Patent: Aug. 19, 1997

[54] METHOD AND APPARATUS FOR INFERRING THE TOPICAL CONTENT OF A DOCUMENT BASED UPON ITS LEXICAL CONTENT WITHOUT SUPERVISION

[75] Inventors: Eric Saund, San Carlos; Marti A. Hearst, San Francisco, both of Calif.

[73] Assignee: Xerox Corporation, Stamford, Conn.

[21] Appl. No.: 307,221

[22] Filed: Sep. 16, 1994

[51] Int. Cl.$^6$ .............................. G06F 17/28; G06F 17/30
[52] U.S. Cl. ............................................. 395/759; 395/761
[58] Field of Search .......................... 364/419.01–419.08, 364/419.1, 419.11, 419.13, 419.19; 382/155, 156, 159, 181, 190, 224, 225, 228–9; 395/751–761, 794

[56] References Cited

U.S. PATENT DOCUMENTS

| | | | |
|---|---|---|---|
| 4,839,853 | 6/1989 | Deerwester et al. | 395/600 |
| 5,301,109 | 4/1994 | Landauer et al. | 364/419.19 |
| 5,317,507 | 5/1994 | Gallant | 364/419.13 |
| 5,371,807 | 12/1994 | Register et al. | 382/159 |

OTHER PUBLICATIONS

Deerwester, S., Dumais, S.T., Furnas, G.W., Landauer, T.K., Harshman, R. Indexing by Latent Semantic Analysis. Journal of the American Society for Information Science. Sep. 1990; pp. 391–407.

DeJong, G.F., Skimming Newspaper Stories by Computer. Research Report #104, May 1977; pp. 1–31.

Dumais, S.T., Nielsen, J. Automating the Assignment of Submitted Manuscripts to Reviewers. Belkin, Ingwersen, and Pejtersen, Editors. Proceedings of the Fifteenth Annual International ACM SIGIR Conference on Research and Development in Information Retrieval; Jun. 1992; Copenhagen, Denmark. pp. 233–244.

Hearst, Marti A., Plaunt, Christian. Subtopic Structuring for Full–Length Document Access. Korfhage, Rasmussen, Willett, Editors. Proceedings of the Sixteenth Annual International ACM SIGIR Conference on Research and Development in Information Retrieval; Jun. 27–Jul. 1, 1993; Pittsburgh, PA; pp. 59–68.

(List continued on next page.)

*Primary Examiner*—Gail O. Hayes
*Assistant Examiner*—Steven R. Yount
*Attorney, Agent, or Firm*—Tracy L. Hurt

[57] ABSTRACT

An iterative method of determining the topical content of a document using a computer. The processing unit of the computer determines the topical content of documents presented to it in machine readable form using information stored in computer memory. That information includes word-clusters, a lexicon, and association strength values. The processing unit beings by generating an observed feature vector for the document being characterized, which indicates which of the words of the lexicon appear in the document. Afterward, the processing unit makes an initial prediction of the topical content of the document in the form of a topic belief vector. The processing unit uses the topic belief vector and the association strength values to predict which words of the lexicon should appear in the document. This prediction is represented via a predicted feature vector. The predicted feature vector is then compared to the observed feature vector to measure how well the topic belief vector models the topical content of the document. If the topic belief vector adequately model the topical content of the document, then the processing unit's task is complete. On the other hand, if the topic belief vector does not adequately model the topical content of the document, then the processing unit determines how the topic belief vector should be modified to improve the prediction of modeling of the topical content.

17 Claims, 10 Drawing Sheets

Jacobs, P.S., Rau, L.F. *SCISOR: Extracting Information from On–line News*. Sibley, E.H., Editor, Communications of the ACM, Nov. 1990, vol. 33, No. 11; pp. 88–97.

Masand, B., Linoff, G., Waltz, D. Classifying News Stories using Memory Based Reasoning. Belkin, Ingwersen, and Pejtersen, Editors. Proceedings of the Fifteenth Annual International ACM SIGIR Conference on Research and Development in Information Retrieval; Jun. 1992; Copenhagen, Denmark. pp. 59–65.

McCune, P., Tong, R.M., Dean, J.S, Shapiro, D.G. *RUBRIC: A System for Rule–Based Information Retrieval*. IEEE Transactions on Software Engineering, vol. SE–11, No. 9, Sep. 1985; pp. 939–945.

Parabolic Interpolation and Brent's Method in One–Dimension. Numerical Recipes in C, The Art of Scientific Computing. Cambridge University Press; pp. 299–302, 315–322.

Phillip J. Hayes. Intelligent high–volume text precessing using shallow, domain–specific techniques. In Paul S. Jacobs, editor, *Text–Based Intelligent Systems: Current Research and Practice in Information Extraction and Retrieval*, pp. 227–242. Lawrence Erlbaum Associates, 1992.

Riloff, E., Lehnert, W. Classifying Texts Using Relevancy Signatures. Natural Language:Parsing; pp. 329–334.

Saund, Eric. *Unsupervised Learning of Mixtures of Multiple Causes in Binary Data*. Spatz, Bruce M., ed., Neural Information Processing Systems 6. San Francisco, CA: Morgan Kaufmann Publishers, Inc.; 1994; pp. 27–34; 1365–1383.

Stanfill, C., Waltz, D. *Toward Memory–Based Reasoning*. Communications of the ACM, Dec. 1986, vol. 29, No. 12; pp. 1213–1228.

Willett, P. *Recent Trends in Hierarchic Document Clustering: A Critical Review*. Information Processing & Management, vol. 24, No. 5, 1988; pp. 577–597.

METHOD AND APPARATUS FOR INFERRING THE TOPICAL CONTENT OF A DOCUMENT BASED UPON ITS LEXICAL CONTENT WITHOUT SUPERVISION

FIELD OF THE INVENTION

The present invention relates to a method of determining the relationships between words and topics in documents. In particular, the present invention relates to a computerized method of characterizing the topical content of documents from their lexical content using a multiple cause mixture model.

BACKGROUND OF THE INVENTION

Computerized text categorization systems attempt to provide useful topical information about texts with limited input from humans. The computerized text categorization systems currently available use different methods to achieve this objective and consequently suffer from different drawbacks. A number of systems permit the assignment of multiple topics to a single text. These systems typically require a large number of training texts that have been pre-labeled by a human with topic codes. Other text categorization systems use document clustering and latent semantic indexing to topically categorize text. These systems do not require pre-labeled training texts. The usefulness of such systems is limited because only one topic can be assigned to any document. Still another text categorization system permits multiple topics to be assigned to each document and does not require pre-labeled training texts. This system categorizes documents using a probabilistic model generated from a list of terms representative of pre-specified categories that are provided in advance. Thus, there exists a need for a computerized text categorization system that does not require advance hand-labeling of learning text, or pre-specified categories and is capable of assigning multiple topics to a single document.

SUMMARY OF THE INVENTION

An object of the present invention is to provide a computerized method of textual topic categorization that does not require advance hand-labeling of training texts.

Another object of the present invention is to provide a computerized method of textual topic assignment that does not require pre-specified topics.

Yet another object of the present invention is to provide a computerized method of textual topic assignment that permits assignment of multiple topics to a single document.

A method of determining the topical content of a document using a computer will be described. The processing unit of the computer determines the topical content of documents presented to it in machine readable form using information stored in the computer memory. That information includes word clusters, a lexicon, and association strength values, which together represent a multiple cause mixture model.

The processing unit uses an iterative approach to determine topical content. The approach begins with generation of an observed feature vector for the document selected for topical characterization. The observed feature vector indicates which of the words of the lexicon appear in the document. Afterward, the processing unit makes an initial prediction of the topical content of the document via a topic belief vector that indicates the extent to which each of the word clusters is present in the document. The processing unit uses the topic belief vector and the association strength values to predict which words of the lexicon should appear in the document. The processing unit represents this prediction via a predicted feature vector. The processing unit compares the predicted feature vector to the observed feature vector to measure how well the topic belief vector models the topical content of the document. If the topic belief vector adequately models the topical content of the selected document, then the processing unit's task is complete. On the other hand, if the topic belief vector does not adequately model the topical content of the document, then the processing unit determines how the topic belief vector should be modified. Armed with the new topic belief vector, the processing unit again predicts the lexical content of the document and compares it to the observed feature vector. The processing unit continues this process until it discovers a topic belief vector that adequately models the topical content of the document.

Other objects, features, and advantages of the present invention will be apparent from the accompanying drawings and the detailed description that follows.

BRIEF DESCRIPTION OF THE DRAWINGS

The present invention is illustrated by way of example and not by way of limitation in the figures of the accompanying drawings in which like references indicate similar elements.

DETAILED DESCRIPTION OF THE PREFERRED EMBODIMENTS

A. Introduction

Figure 1:
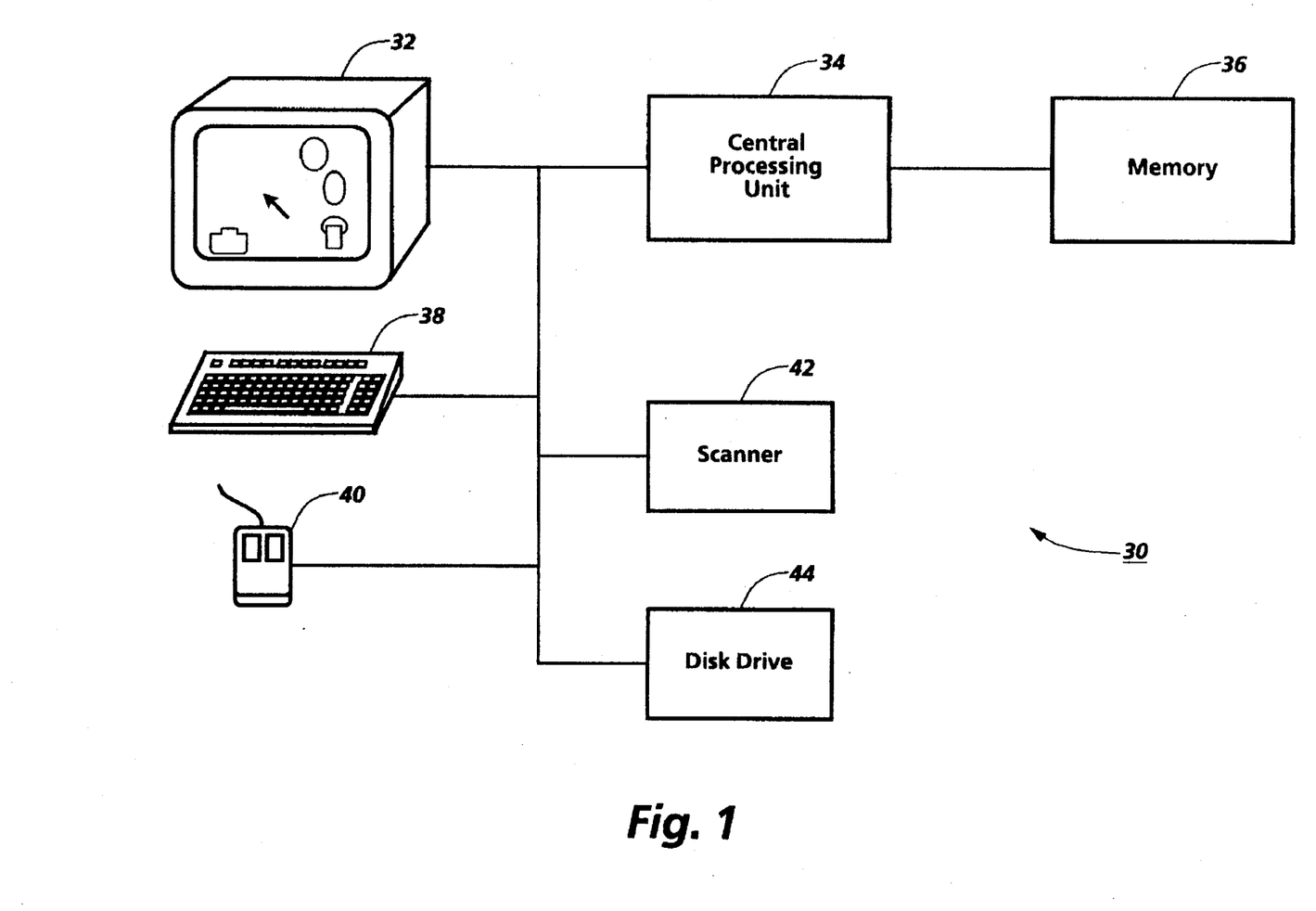
FIG. 1 is a block diagram of computer system for learning without supervision the topical content of documents from their lexical content.

FIG. 1 illustrates a computer system 30 that analyzes the lexical content of machine readable documents without supervision to determine the topics discussed by those documents. Computer system 30 permits assignment of multiple topics to a single document and does not require hand-labeled training documents, or pre-specified topics.

Computer system 30 includes a monitor 32 for visually displaying information to a computer user, a central processing unit 34 and internal memory 36. Internal memory 36 can be realized using solid state memory devices such as read only memories (ROMs), random access memories (RAMs), dynamic random access memories (DRAMs), programmable read only memories (PROMs), erasable programmable read only memories (EPROMs), and electrically erasable programmable read only memories (EEPROMs), such as flash memories. Keyboard 38 allows the computer user to input information to central processing unit 34. Mouse 40 enables the computer user to move a pointer on monitor 32 to select icons also displayed on monitor 32. Scanner 42 and disk drive 44 provide alternate avenues for data input to central processing unit 34. Other input devices, such as a pen based tablet or a fax modem, can be added to computer system 30. In accordance with the present invention object code residing within internal memory 36 or on a floppy disk within disk drive 44, or stored on other machine readable media, enables central processing unit 34 to learn the relationship between words and topics and then use that learning to characterize the topical content of a machine readable document based upon its lexical content.

B. Multiple Cause Mixture Model

Central processing unit 34 uses a multiple cause mixture model to learn and characterize the topical content of machine readable documents without supervision. Multiple cause mixture modeling supports the assumptions that:

1) The occurrence of words in a document is related to the occurrence of topics in that document and vice versa;
2) Multiple topics may occur in a single document;
3) The occurrence of a word can be caused by more than one topic; and
4) One topic does not predict the presence of another topic.

Multiple cause mixture modeling offers the advantage of unsupervised topical characterization of machine readable documents without the expense and speed penalties of full text search methods.

Figure 2:
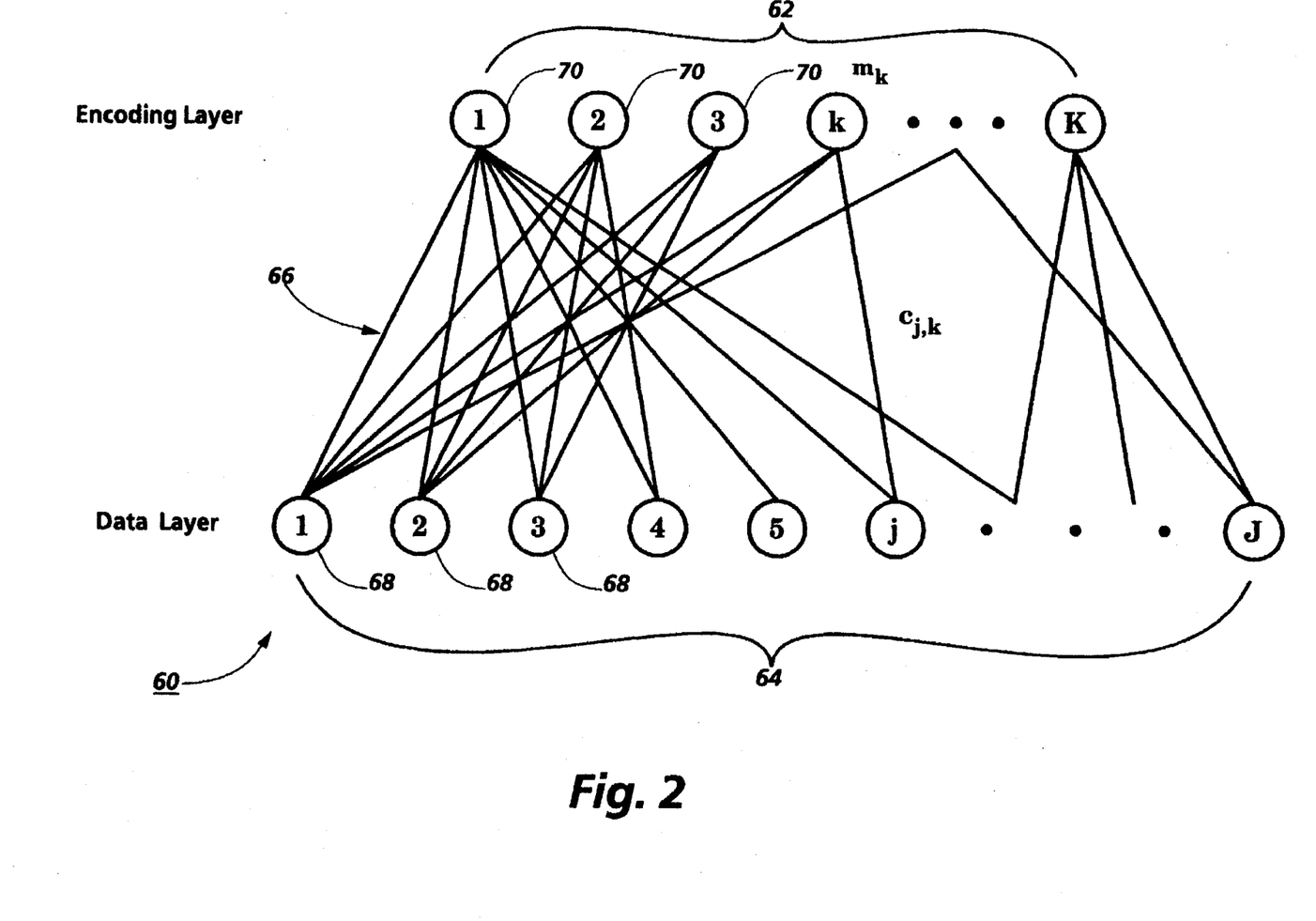
FIG. 2 illustrates a multiple cause mixture model.

FIG. 2 represents the architecture of a multiple cause mixture model 60 used to model the relationships between topics and words in a single document, or in a set of documents. Model 60 links encoding layer 62 to data layer 64 via association strengths 66. Encoding layer 62 represents the topical content of a document, or documents, while data layer 64 represents the lexical content of a document, or documents.

The lexical content of a document can also be represented via an observed feature vector. Each dimension of an observed feature vector represents one word of a set of words indicative of topical content. That set of words is referred to as a lexicon. Each word of the lexicon is represented by a node 68 in FIG. 2. The scalars associated with each dimension of observed feature vectors are binary valued, simply indicating whether or not each word of the lexicon is or is not present in a particular document. For this reason, the scalars in observed feature vectors are also called occurrence bits. Notationally, the scalar values for the observed feature vector for the ith document is represented by:

$$d_i = (d_{i,1}, d_{i,2}, d_{i,3}, \ldots d_{i,J}),$$

where;

$d_{i,j}$ represents the value of the scalar for the jth dimension of the ith document; and J indicates the number of words in the lexicon.

In an analogous manner, the topical content of a document can be represented via a topic belief vector. Each dimension of a topic belief vector represents one word-cluster, or group of words, that tend to occur together in documents. For example, a word-cluster may indicate that the words "surf," "wave," "water," "surfboard," and "tubular" tend to occur together in documents. Each word-cluster is indicated by a node 70 in FIG. 2. The presence of word-clusters, or topics, in a document is represented by a topic belief vector, in which each dimension represents one of the K word clusters of the multiple cause mixture model. Each dimension of a topic belief vector is associated with a scalar, which is not binary valued. Scalars associated with topic belief vectors may vary in value from 0 to 1, with a value of 0 indicating that the associated word-cluster is not present in a document and a value of 1 indicating that the associated word-cluster is fully present. A word-cluster may also be present in a document to some intermediate degree. Notationally, the scalar values of the topic belief vector for the ith document is represented by:

$$m_i = (m_{i,1}, m_{i,2}, m_{i,3}, \ldots m_{i,K}),$$

where:

$m_{i,k}$ represents the value of the scalar multiplying the kth dimension of the ith document; and K indicates the number of word clusters in the model.

Each association strength 66, $c_{j,k}$, represents the probability that the jth word will occur when only the kth word-cluster is present and is fully present in a document, where $0 \leq c_{j,k} \leq 1$. In other words, according to the multiple cause mixture model words appear in a document in a probabilistic manner that can be predicted based upon which word-clusters occur in the document. Frequently, more than one word-cluster is present in a document; i.e., $m_i$ includes more than one nonzero value. The probability, $r_{i,j}$, that the jth word will occur in the ith document when more than one word-cluster is present can be expressed by a mixing function of the soft disjunctive form. The preferred soft disjunctive mixing function is:

$$r_{i,j} = 1 - \Pi_k(1 - m_{i,k} c_{j,k}).$$

Other soft disjunctive mixing functions can be used to predict the probable occurrence of words in documents.

The predicted lexical content of the ith document can be represented as a predicted feature vector of the form:

$$r_i = (r_{i,1}, r_{i,2}, r_{i,3}, \ldots r_{i,J})$$

where $r_{i,j}$ is the value of the scalar multiplying the jth dimension of the ith document.

By predicting the known lexical content of a document, the topical content of a document and association strength values can be learned through an iterative process. The process includes guessing at the value of a topic vector $m_i$ and association strength values, predicting the words, $r_i$, appearing in the document, measuring how well that prediction matches the words, $d_i$, actually appearing in the document and adjusting the values of $m_i$ and $c_{j,k}$ to improve the match between $r_i$ and $d_i$. How well the predicted words for a document, $r_i$, match the actual words in that document, $d_i$, can be determined using a cost function, which is also called an objective function or a goodness function. Preferably, the cost of the model for the ith document, $g_i$, is measured using a standard log likelihood function of the form:

$$g_i = \Sigma_j \log_2 [d_{i,j} r_{i,j} + (1 - d_{i,j})(1 - r_{i,j})].$$

Cost functions other than the standard log likelihood function can be used to measure the performance of a particular version of the multiple cause mixture model. Regardless of the function used to measure it, cost is a scalar formed by summing the elements of a vector with J dimensions, each dimension representing the cost per word of the lexicon. The cost per word includes a cost contributed by each word-cluster. Thus, it is possible to evaluate the cost of a model per document, word-cluster, or word of the lexicon, as desired.

The cost of the model for a set of documents can be determined summing the cost for each document. In other words:

$$g_{global} = \Sigma_i \, g_i$$

Both association strength values and a topic belief vector for a particular document can be reached in an iterative fashion by performing conjugate gradient descent in the cost. A routine for performing conjugate gradient descent of a multidimensional function is set forth in *Numerical Recipes In C*, by Press et al. at pages 317–32. The gradient of the cost is itself a vector, the dimensions of which can be used to adjust association strength values or scalars associated with a topic belief vector to reduce cost.

Figure 3:
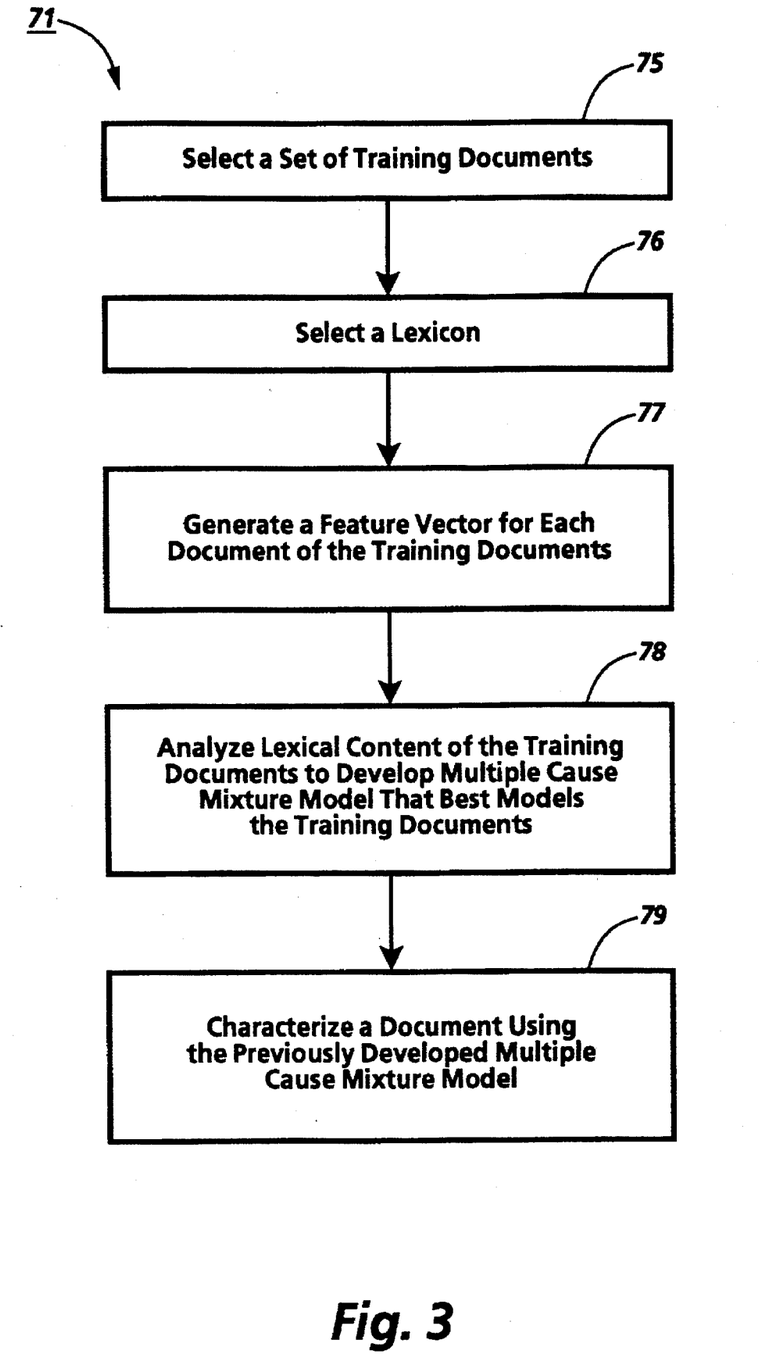
FIG. 3 is a flow diagram of a method of learning the relationship between words and topical content in documents and using that learning to topically categorize other documents.

C. Learning and Predicting Topical Content Based Upon Lexical Content Using the Multiple Cause Mixture Model FIG. 3 illustrates in flow diagram form the major tasks performed by computer system 30 to learn the relationships between words and topics and using that learning to characterize a document. Briefly described, using process 71 computer system 30 engages in three major activities: preparation, learning and document characterization. During preparation steps 75, 76, and 77 a set of training documents is selected, as well as a lexicon. During learning step 78 processing unit 34 uses the lexicon and machine readable versions of the training documents to develop a multiple cause mixture model with the appropriate number of word-clusters and association strength values. Afterward, during step 79, processing unit 34 uses the previously developed multiple cause mixture model to characterize the topical content of documents not included in the training set. Computer system 30 can also use the multiple cause mixture model to locate documents in a database based upon desired topical content, as well as perform other tasks.

Preparations for learning begin with selection by a user of computer system 30 of a set of training documents. The number of documents selected during step 75 depends upon how much time a user is willing to allow computer system 30 to spend learning the association strength values and word-clusters of the multiple cause mixture model. The time required to develop the multiple cause mixture model increases as the number of documents included in the training set increases; however, increasing the number of documents in the training set also improves the quality of the multiple cause mixture model developed. Preferably, approximately ten thousand documents should be included in the training set. The topical content of the training set of documents is also a matter of choice. Preferably, documents selected for the training set are related to the type of documents that computer system 30 will be expected to characterize. For example, if computer system 30 will be used to characterize the topical content of biology technical papers then the set of learning of documents would also preferably be related to biology. No tagging or characterization of the set of training documents is necessary. All that is necessary to their use in learning is that the documents be presented to computer system 30 in a machine readable form. The set of training documents may be stored within internal memory 36 or on some other machine readable media accessible to computer system 30.

Preparations for learning continue during step 76 with the selection of a lexicon by computer system 30. Computer system 30 selects the words of the lexicon based upon the frequency with which they occur in a set of documents. Preferably, processing unit 34 selects the lexicon from the set of the training documents, but other documents may be used. A number of assumptions are used to select members of the lexicon. During step 76 processing unit 34 assumes that words that occur infrequently in a document are unrelated to a document's topical content while words that occur frequently are related to a document's topical content. Additionally, processing unit 34 assumes that some words appear so frequently in all documents that they are not predictive of topical content. Such words include, for example, "a," "the," "an," and "and."

The size, J, of the lexicon selected depends upon the computing power of central processing unit 34 and the amount of time a user is willing to devote to selecting the lexicon and developing the multiple cause mixture model. As the size of the lexicon increases, the time required to perform these two tasks increases. A lexicon of approximately 5000 words should be adequate for most uses; i.e., J≈5000, though larger lexicons may be chosen consistent with the spirit of the present invention. The lexicon includes the X+1 through J+X most frequently occurring words to exclude a number, X, of the most frequently occurring words in the set of documents. Excluding the 500 most frequently occurring words should be adequate for most applications; in other words, preferably X≈500.

Processing unit 34 completes preparations for learning during step 77 with the generation of an observed feature vector, $d_i$, for each document in the training set. A single occurrence of any word of the lexicon in a document is insufficient to set that word's occurrence bit in the document's observed feature vector because words unrelated to a document's topical content may occur spuriously. Processing unit 34 uses a thresholding function to determine which occurrence bits should be set in each document's observed feature vector. While an arbitrary number can be selected as a threshold for determining whether to set a word's occurrence bit, the preferred thresholding function takes advantage of Zipf's law. Zipf's law states that in a typical document the number of words occurring a number of times, R, is inversely proportional to that number, R. Zipf's law can be stated mathematically as:

$$f = \alpha/R,$$

where:

R represents the rank, or number of occurrences, of a word in a document;

f represents the number of words expected to appear in a document R times; and a is a constant.

Figure 4:
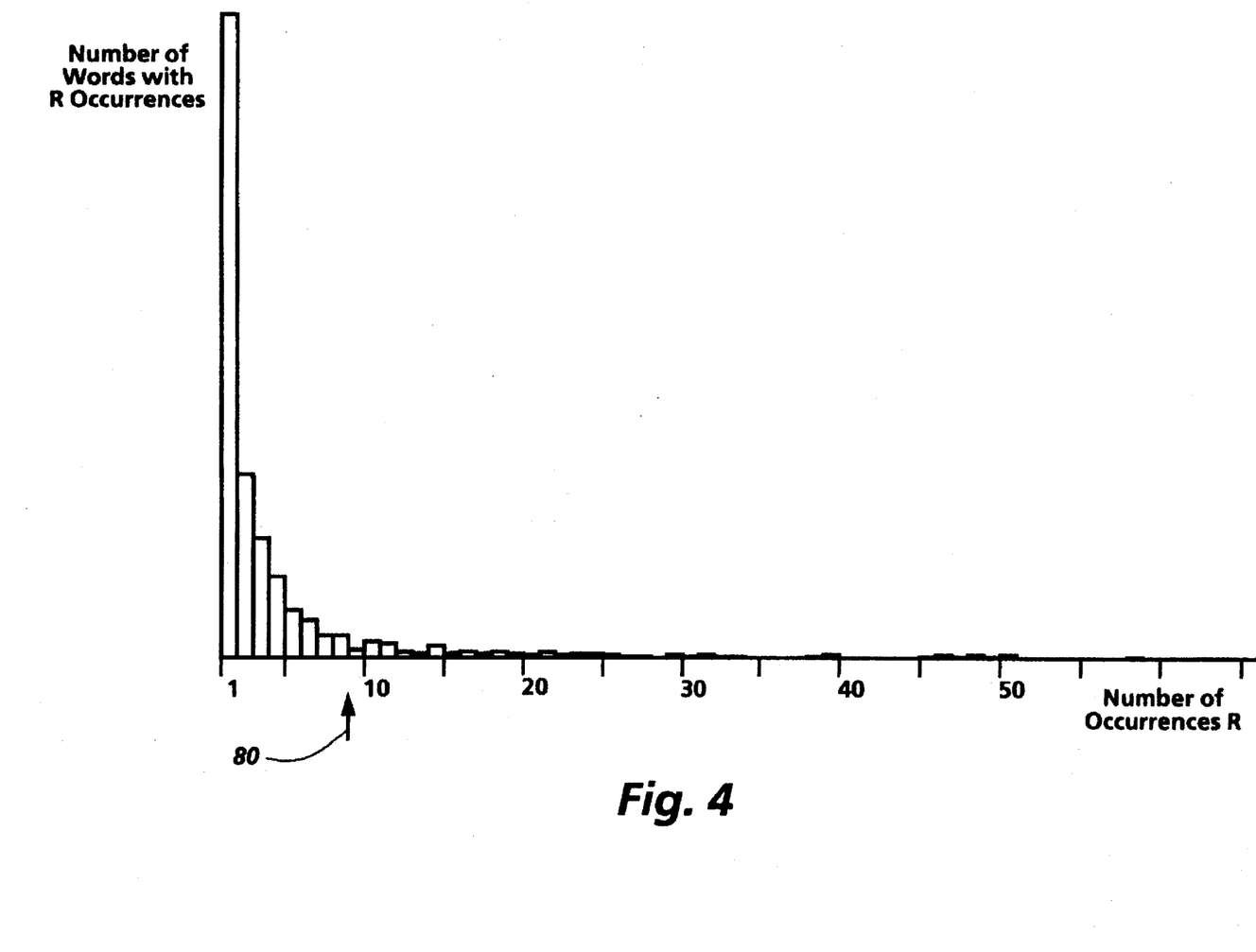
FIG. 4 is a histogram showing the relationship between the number of words and the number of times each word appears in a document.

FIG. 4 illustrates a histogram for a typical document that displays the behavior predicted by Zipf's law. The histogram includes a knee 80 near which the number of words with R occurrences falls off rapidly. Thus, the knee 80 of the histogram represents a desirable threshold for determining which occurrence bits to set in a document's feature vector. The location of knee 80 depends upon the word length of the document. As document size increases knee 80 moves to larger values of R. In other words, a is proportional to document length. α can be estimated for all documents using each document's actual histogram counts and a least squares fit. Accordingly, $$\alpha = \frac{\Sigma_R F(R)/R}{\Sigma_R 1/R^2};$$

where:

F(R) represents a document's actual histogram count.

A thresholding function of the form $W\alpha$ selects a threshold near the histogram knee 80 of each document, where W is a constant for all documents in the training set. Using this thresholding function and the lexicon, central processing unit 34 generates a feature vector for each document in the training set. After generating a feature vector for each document central processing unit 34 advances to step 78 from step 77.

Central processing unit 34 analyzes the set of training documents to learn the relationship between word-clusters and words of the lexicon during step 78. In other words, during step 78 central processing unit 34 determines the number of word-clusters and association strength values, $c_{j,k}$, adequately relating those word-clusters to the words of the lexicon for the set of training documents. Central processing unit 34 develops the multiple cause mixture model in an iterative fashion, making an initial guess about the number of word-clusters and their related association strength values, determining how well that guess predicts the observed lexical content of the set of training documents on a document-by-document basis and using that information to adjust the number of word-clusters and association strength values.

After step 78 a user can pause to label the word-clusters just learned with topic names. It is believed that the related words of each word-cluster will suggest a suitable topic name. Whether or not the word-clusters can be easily labeled does not effect their subsequent usefulness in characterizing documents.

Users of computer system 30 derive benefit during step 79 from the time invested during step 78 to develop the multiple cause mixture model. Given the multiple cause mixture model and the lexicon, central processing unit 34 can rapidly determine the topical content of any document presented to it in a machine readable form during step 79. Central processing unit 34 determines the topical content of documents presented to it in an iterative fashion. First, an observed feature vector is generated for the selected document using the lexicon selected during step 76. Central processing unit 34 then makes an initial guess about the extent to which all possible topics, i.e., word-clusters, are present in the selected document. Central processing unit 34 uses the topic belief vector to predict which words of the lexicon appear in the selected document. Next, central processing unit 34 compares the predicted words, $r_i$, to the selected document's observed feature vector, $d_i$, to determine how well the initial guess about topical content matched the actual topical content of the document. Central processing unit 34 can adjust the values of topic belief vector until it adequately predicts the actual lexical content of the selected document.

Figure 5:
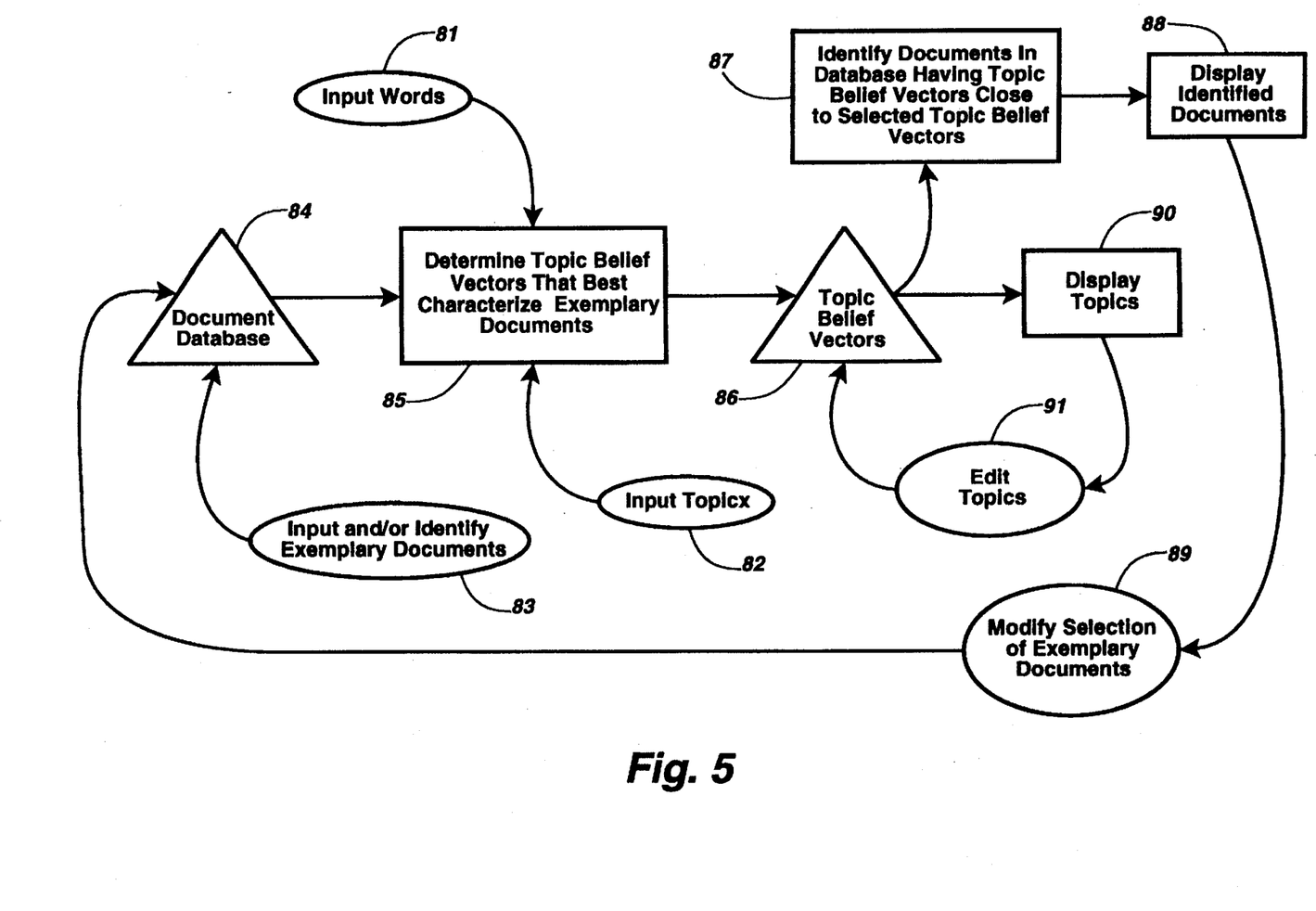
FIG. 5 illustrates ways in which the learned relationships between words and topics can be used.

The multiple cause mixture model developed by central processing unit 34 can be used for tasks other than topical characterization of documents. An anticipated use of a multiple cause mixture model after development is searching of a document database. FIG. 5 illustrates some of the other ways a user might interact with computer system 30 to identify documents of interest within a document database using the multiple cause mixture model developed during step 78. FIG. 5 is not intended to be exhaustive. FIG. 5 uses conventions intended to highlight how a user might interact with computer system 30. Triangles indicate data stored by computer system 30, rectangles indicate actions performed by computer system 30, and ovals indicate user actions.

Interaction with computer system 30 can be initiated by a user in at least three different manners. A user can identify the type of documents to be located by inputting words 81 or topics 82 to central processing unit 34 using one of the computer system's input devices. Additionally, the user could identify exemplary documents 83 that exemplify the topical content of the documents the user wishes to locate. The exemplary documents may be already present within the document database 84, or the user could input the exemplary documents in machine readable form to computer system 30. Central processing unit 34 uses exemplary documents, words, or topics to generate exemplary topic belief vectors representative of the type of documents that the user desires 85.

Central processing unit 34 uses the exemplary topic to select topic belief vectors 86 associated with the document database 84. At this point, central processing unit 34 can provide the user with one of two types of information. On one hand, central processing unit 34 can use the topic belief vectors it selected from database 86 to identify 87 and display documents 88 within document database 84. If the identified documents are not exactly what the user desires, the user may modify the selection of exemplary documents 89 and continue the search. On the other hand, central processing unit 34 can take the topic belief vectors it selected from database 86 and display the associated topics to the user 90. The user may refine the search in response by editing the displayed topics 91. The user may interact with computer system 30 until locating the desired documents.

D. Learning Relationships Between Words and Topics

Figure 6A:
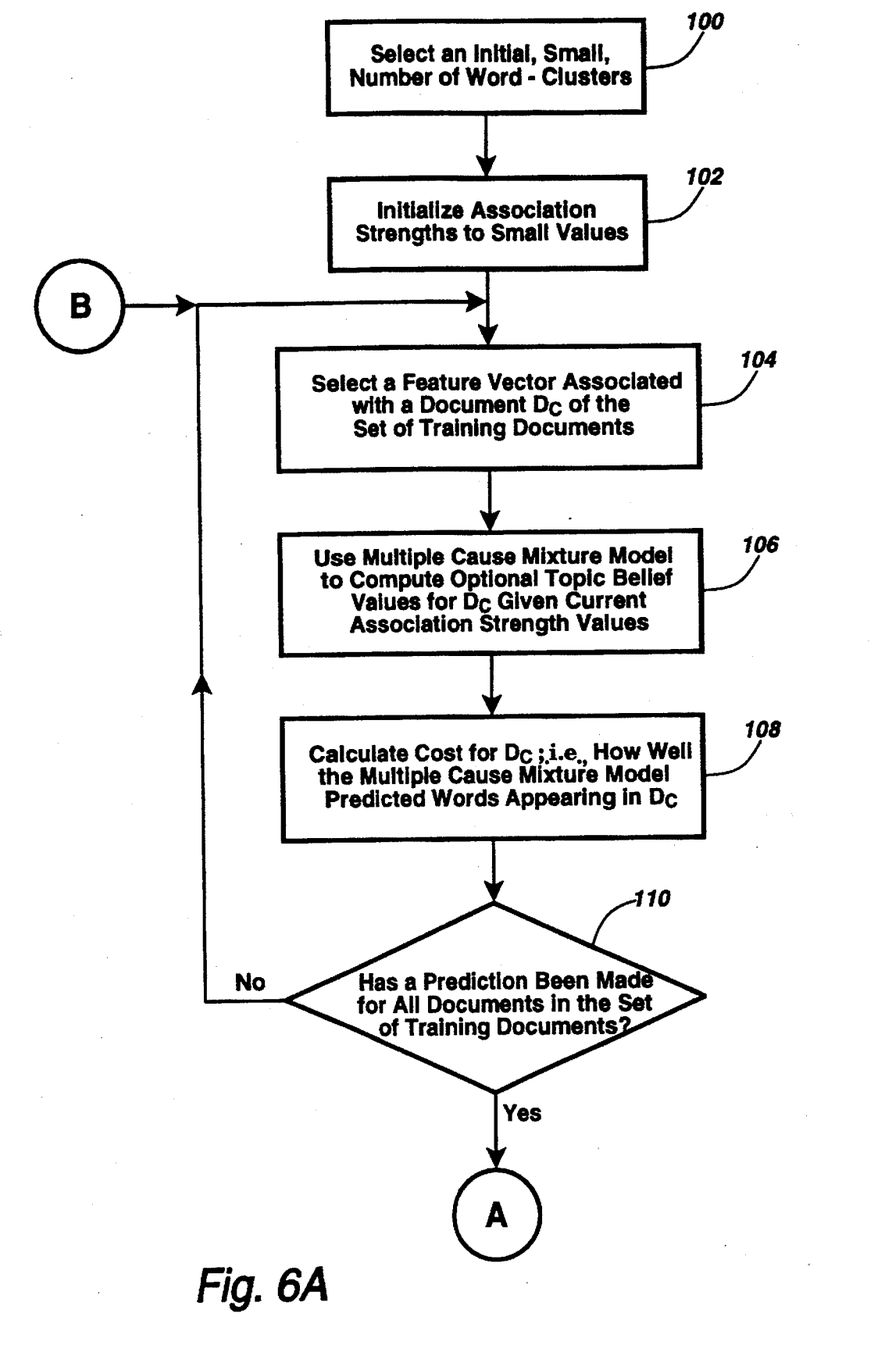
FIG. 6 is a detailed flow diagram of a method of learning association strength values and word clusters from a set of training documents.
Figure 6B:
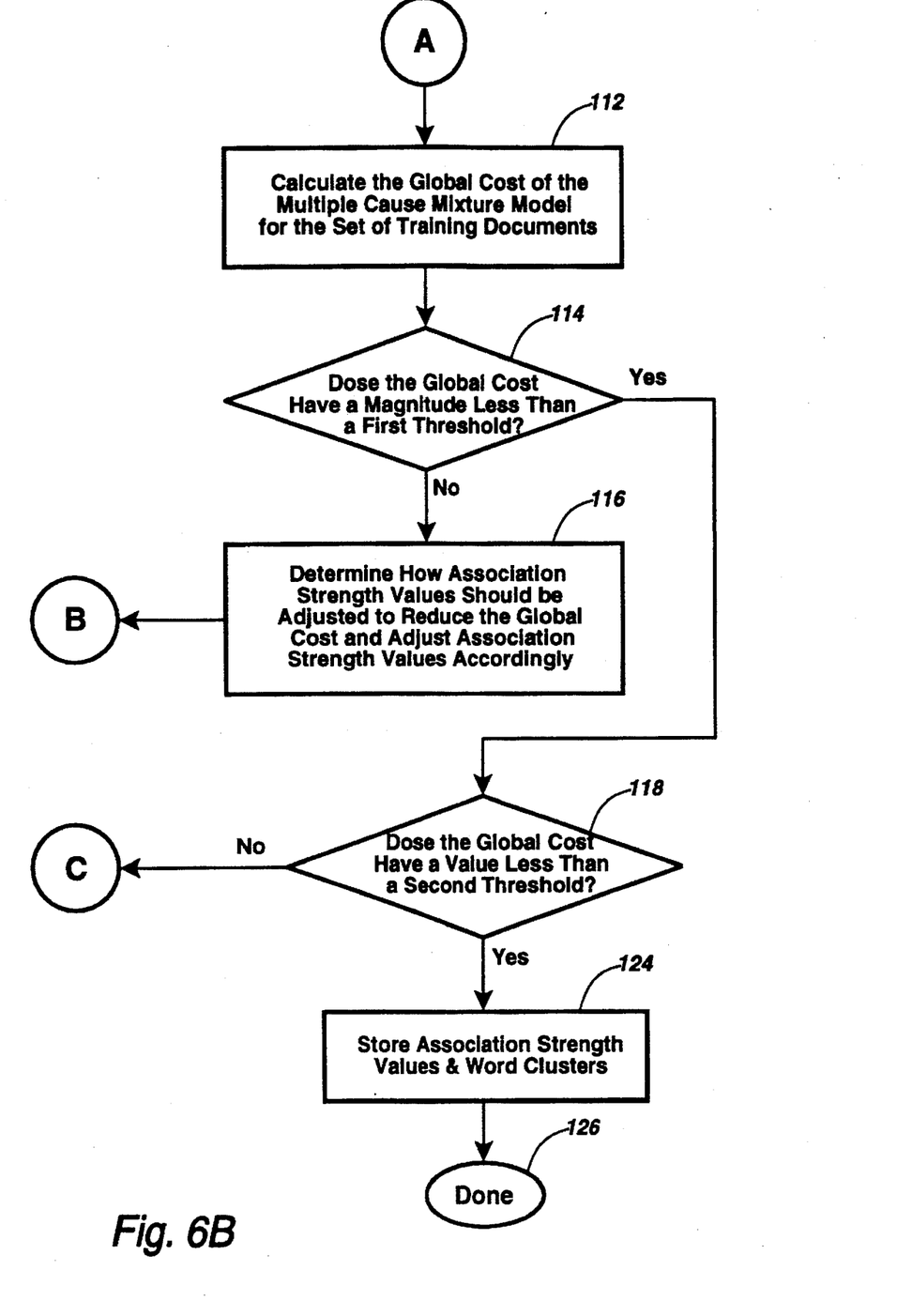
Figure 6C:
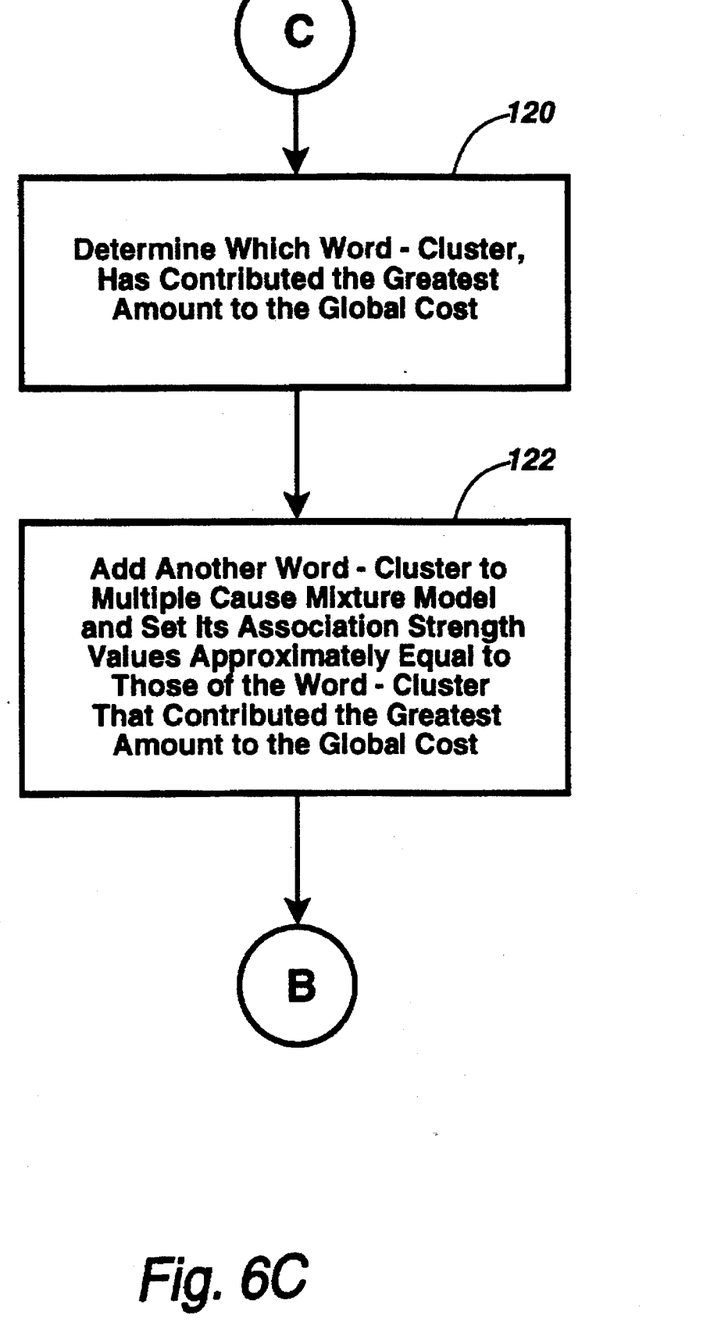

The flow diagram of FIG. 6 illustrates in detail the process 78 used by central processing unit 34 to learn the number of word clusters and association strength values from the set of training documents. Process 78 is realized in a machine readable form, such as object code, and stored within internal memory 36 or on other machine readable media. Process 78 uses three nested optimization loops to develop the multiple cause mixture model. Those three loops are an outer loop, a middle loop, and an inner loop. Central processing unit 34 uses the outer loop to determine an adequate number of word-clusters for the multiple cause mixture model. Central processing unit 34 adds word-clusters to the model until no word-cluster contributes disproportionately to the total cost or goodness. Central processing unit 34 determines adequate association strength values for a given number of word-clusters using the middle loop. Central processing unit 34 does so by identifying those association strength values that produce a total cost less than a threshold. Central processing unit 34 determines the total cost by calculating a cost for each document in the training set and summing those individual costs together. Using the inner loop, central processing unit 34 determines an adequate topic belief vector for a document given a particular set of association strength values and number of word clusters. The inner loop is also used to characterize the topical content of documents after learning is complete.

Central processing unit 34 begins execution of process 78 by selecting an initial number of word-clusters for the multiple cause mixture model during step 100. The initial number of clusters chosen should be small, preferably only one. Central processing unit 34 then advances to step 102 to continue preparations for learning. Central processing unit 34 generates initial association strength values, $c_{j,k}$, to associate the words of the lexicon with the initial word-clusters. The initial association strength values chosen should be small random numbers near zero, preferably near 0.1. Initial association strength values should not be equal to ensure that optimum values of the association strengths can be reached via gradient descent. Learning preparations complete, central processing unit 34 advances to step 104 from step 102.

Central processing unit 34 begins the process of calculating the cost of the current multiple cause mixture model for the entire set of training documents, also referred to as the global cost or total cost, in step 104. Central processing unit 34 calculates the global cost by summing together the cost of the current model for each document in the set of training documents. Thus, during step 104 central processing unit 34 selects a document whose cost has not yet been calculated. Central processing unit 34 then branches to step 106.

During step 106 central processing unit 34 determines the extent to which the current word-clusters are present in the selected document. In other words, during step 106 central processing unit 34 generates an optimum topic belief vector, $m_i$, for the selected document. Determining the optimum topic belief vector for the selected document enables central processing unit 34 to make the best possible prediction of the lexical content of the selected document, which in turn enables central processing unit 34 to make the most accurate assessment of the document cost of a particular set of word-clusters and association strength values. Armed with the optimum topic belief vector for the selected document, central processing unit 34 advances to step 108.

Central processing unit 34 uses a mixing function during step 108 to predict the lexical content, $r_i$, of the selected document using the topic belief vector, $m_i$, and the association strength values associated with each word cluster. Central processing unit 34 takes the predicted lexical content, $r_i$, and the document's observed feature vector, $d_i$, to determine the cost of current model values for the selected document. Central processing unit 34 stores this cost and advances to step 110 from 108.

Central processing unit 34 decides whether it has evaluated the cost of the current model for all documents in the training set during step 110. If not, central processing unit 34 branches through steps 104, 106, 108, and 110 until it has calculated a cost for each document in the training set. When that occurs central processing unit 34 advances to step 112 from step 110.

The global cost of the current model is calculated during step 112 by summing together the cost for each document in the training set. During step 114 central processing unit 34 compares the magnitude of the global cost to a first threshold cost, which is arbitrarily selected in advance. As the value of the first threshold cost decreases the time required to execute the middle loop increases. If the magnitude of the global cost is greater than the first threshold cost, central processing unit 34 advances to step 116 and continues efforts to reduce the magnitude of the global cost.

Central processing unit 34 takes the gradient descent of the global cost during step 116 to determine the magnitude and direction of change association strength value necessary to reduce the global cost. Central processing unit 34 then adjusts the association strength values accordingly. Afterward, central processing unit 34 branches back to step 104 to begin the process of calculating the global cost of the model using the new association strength values.

After a number of iterations through steps 104, 106, 108, 110, 112, 114, and 116, central processing unit 34 discovers a set of association strength values that produce a global cost with a magnitude less than the first threshold cost. When that occurs, central processing unit 34 branches from step 114 to step 118. During step 118 central processing unit 34 decides whether another word-cluster should be added to the multiple cause mixture model to reduce the global cost. Central processing unit 34 makes that decision by comparing the magnitude of the last calculated global cost to a second threshold cost. If the magnitude of the last calculated global cost is greater than the second threshold cost then central processing unit 34 will add another cluster to the model. In that case, central processing unit advances to step 120 from step 118.

Figure 7A:
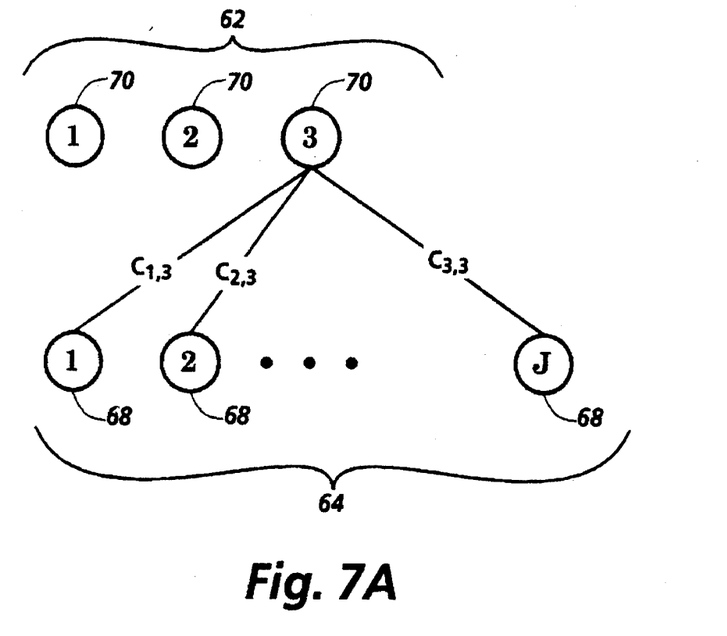
FIG. 7A illustrates the architecture of a multiple cause mixture model with three word clusters.
Figure 7B:
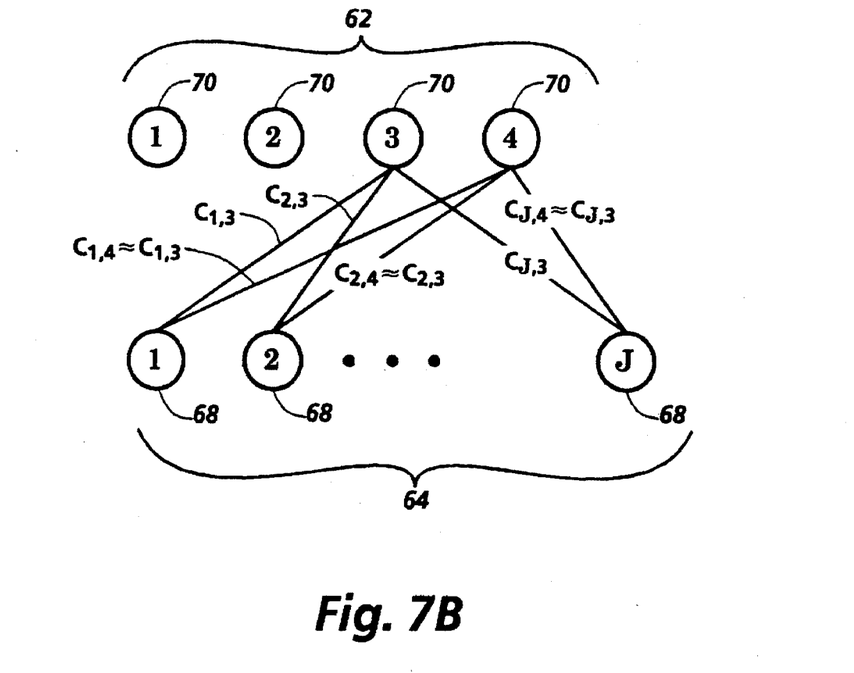
FIG. 7B illustrates the architecture of a multiple cause mixture model to which a fourth word cluster has just been added.

Central processing unit 34 adds word-clusters to the multiple cause mixture model by splitting one word-cluster into multiple word-clusters, preferably two. Central processing unit 34 decides which word-cluster to split in two during step 120 by determining which word-cluster contributed the greatest cost to the global cost. Central processing unit 34 adds the new cluster to the model during step 122. To illustrate, consider the multiple cause mixture model shown in FIG. 7, which includes three word-clusters. For purposes of clarity, only the association strengths associated with word-cluster 3 are illustrated in FIG. 7A. Assume that word-cluster 3 contributes the greatest cost to the global cost and is to be split into two word-clusters. Central processing unit 34 adds word-cluster 4, as shown in FIG. 7B. Central processing unit 34 sets the association strength values between word-cluster 4 and each word of the lexicon to values approximately equal to those of word-cluster 3. In other words, $c_{1,4} \approx c_{1,3}, c_{2,4} \approx c_{2,3}, c_{3,4} \approx c_{3,3}, \ldots c_{J,4} \approx c_{J,3}$. Association strength values associated with the new word-cluster should not be set to the same values as the word-cluster being split so that the two word-clusters will generate different costs. After adding the new word-cluster, or word-clusters, central processing unit 34 begins the process of adjusting association strength values in view of the new set of word-clusters by branching back to step 104.

After repeated iterations of the outer loop, central processing unit 34 converges upon a set of word-clusters and association strength values for the multiple cause mixture model that yield a global cost less than the second threshold cost. When that occurs, central processing unit 34 branches from step 118 to step 124. Central processing unit 34 stores these word-clusters and association strength values during step 124. Learning complete, central processing unit 34 advances to step 126.

E. Computing Topic Beliefs

Figure 8:
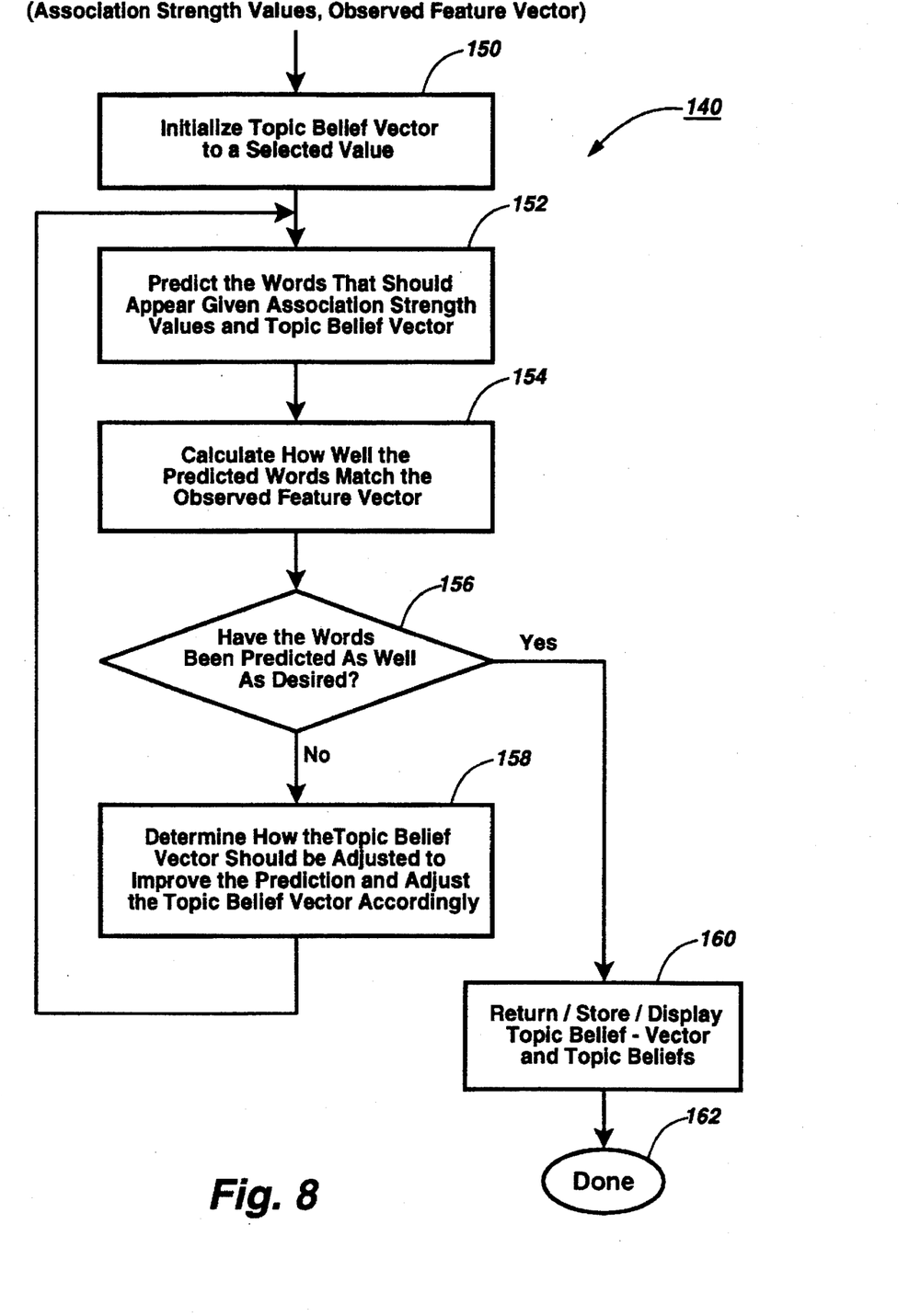
FIG. 8 is a detailed flow diagram of a method of discovering the topic belief vector that adequately models the topical content of a document.

FIG. 8 illustrates in flow diagram form process 140, which is used by central processing unit 34 to determine topical content of a document. Process 140 is stored in a machine readable form within internal memory 36 or on other machine readable media. Central processing unit 34 is able to use process 140 during learning step 106, and document characterization step 79 because both steps 106 and 79 involve determining an adequate topic belief vector, m, given known and constant association strength values and the observed feature vector, d, for a selected document, denoted $D_s$. These are provided to central processing unit 34 prior to its execution of process 140.

Central processing unit 34 begins execution of process 140 by making an initial guess as to the value of the document's topic belief vector, m, during step 150. Each scalar of the topic belief vector is set to an arbitrary initial value, preferably 0.5. Each scalar may be set to the same initial value. After generating an initial value for the topic belief vector central processing unit 34 advances to step 152 from step 150.

With step 152 central processing unit 34 begins evaluating how well the current value of the topic belief vector models the topical content of $D_s$. First, central processing unit 34 predicts the words of the lexicon appearing in $D_s$ during step 152 by applying a soft disjunctive mixing function to the input association strength values and the current topic belief vector. Having calculated a value for the predicted feature vector, r, central processing unit 34 advances to step 154 to measure how well r predicts d by calculating the cost, g. Central processing unit 34 uses g during step 156 to evaluate how well m predicts the topical content of $D_s$. Central processing unit 34 does so by comparing g to a third threshold cost, which may be arbitrarily chosen. As the value of the third threshold cost decreases the time required to find an adequate topic belief vector increases. If g is greater than the third threshold cost, then central processing unit 34 treats the current prediction of the topical content of $D_s$ as inadequate and branches to step 158 from step 156.

Central processing unit 34 determines how the topic belief vector should be adjusted to improve its modeling of the topical content of $D_s$ during step 158. Central processing unit 34 does this by performing conjugate gradient descent in the cost calculated during step 154 to modify the scalar values of the topic belief vector, m. That done, central processing unit 34 returns to step 152 to begin evaluation of this new topic belief vector.

Central processing unit 34 executes the loop of steps 158, 152, 154, and 156 until values of the topic belief vector are found that produce a cost for $D_s$ less than the third threshold cost. When that occurs, central processing unit 34 branches to step 160 from step 156 because the current topic belief vector is an adequate representation of the topical content of $D_s$. During step 160 central processing unit 34 stores the value of the topic belief vector that adequately represented the topical content of $D_s$ so that it can be used later by other processes. Central processing unit 34 may also display to a user of computer system 30 the topic belief vector and topic labels, if available, during step 160. Afterward, its task complete, central processing unit 34 branches to step 162.

Thus, two computerized methods useful in text categorization have been described. One method learns the relationship between words and topics. The other method uses that learning to topically characterize documents.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of characterizing a topical content of a document using a computer including a processing unit and a memory, the memory storing the document in a machine readable form and storing a first multiplicity of word-clusters, a lexicon including a second multiplicity of words, and a third multiplicity of association strengths, each association strength having a value relating a one of the word-clusters to a one of the second multiplicity of words, the document having an observed lexical content, the processing unit implementing the method by executing method steps stored in machine readable form in the memory, the method comprising the computer implemented steps:

a) predicting the topical content of the document via a topic belief vector having a value;

b) predicting a predicted lexical content of the document using the topic belief vector, the association strength values, and a soft disjunctive mixing function;

c) determining how well the topic belief vector predicted the topical content of the document by comparing the predicted lexical content of the document to the observed lexical content of the document;

d) modifying the value of the topic belief vector to improve prediction of the observed lexical content of the document;

e) repeating steps b) through d) until the topic belief vector adequately represents the topical content of the document.

2. A method of determining a topical content of a document using a computer, the computer including a processing unit coupled to a memory, the memory storing in machine readable form a first multiplicity of word clusters, a lexicon including a second multiplicity of words, and a third multiplicity of association strengths, each association strength having a value representing a relationship between a one of the word-clusters and a one word of the second multiplicity of words, the document including a fourth multiplicity of words, the processing unit implementing the method by executing method steps stored in machine readable form in the memory, the method comprising the computer implemented steps of:

a) generating an observed feature vector from a machine readable form of the document, the observed feature vector indicating which of the words of the second multiplicity of words are included in the fourth multiplicity of words of the document;

b) predicting the topical content of the document via a topic belief vector, the topic belief vector indicating an extent to which it is predicted each of the first multiplicity of word-clusters is present in the document;

c) predicting the lexical content of the document via a predicted feature vector generated by applying the topic belief vector, the first multiplicity of word-clusters and the association strengths to a soft disjunctive mixing function;

d) determining how well the topic belief vector predicted the topical content of the document via a cost, the cost being calculated using the predicted feature vector and the observed feature vector;

e) modifying the topic belief vector to reduce the cost;

f) repeating steps c) through e) until a value of the cost less than a threshold cost is determined; and g) indicating the topical content represented by the topic belief vector associated with the cost less than the threshold cost.

3. The method of claim 2 wherein the topic belief vector includes a first multiplicity of dimensions, each dimension being associated with a one of the word-clusters, each dimension being associated with a scalar, and wherein the step of modifying the topic belief vector includes the computer implemented steps of:

a) performing conjugate gradient descent on the cost; and b) modifying each scalar associated with the topic belief vector by using the conjugate gradient descent performed on the cost.

4. The method of claim 3 wherein the soft disjunctive mixing function used to predict a jth predicted word, $r_j$, of the predicted lexical content of the document is of the form:

$$r_j = 1 - \Pi_k(1 - m_k c_{j,k}),$$

where:

$r_j$ denotes a scalar value of the predicted feature vector associated with the jth word;

k denotes an index for the first multiplicity of word clusters;

$m_k$ denotes a scalar value of the topic belief vector associated with the kth word cluster; and $c_{j,k}$ denotes an association strength value relating the jth word to the kth word cluster.

5. The method of claim 4 wherein each scalar of the topic belief vector has a value representative of an extent to which an associated word-cluster is present in the document.

6. The method of claim 5 where in step b comprises setting each scalar associated with the topic belief vector to a number less than one.

7. The method of claim 6 wherein the observed feature vector is multidimensional, wherein each dimension is associated with a scalar having a value, and wherein each scalar is binary valued.

8. The method of claim 7 wherein each dimension of the observed feature vector and predicted feature vector each dimension is associated with the presence in the document of a selected word of the lexicon.

9. The method of claim 2 wherein the soft disjunctive mixing function used to predict an occurrence of a jth word of the lexicon in the document is of the form:

$$r_j = 1 - \Pi_k(1 - m_k c_{j,k}),$$

where:

$r_j$ denotes a scalar value of the predicted feature vector associated with the jth word;

k denotes an index for the first multiplicity of word-clusters;

$m_k$ denotes a scalar value of the topic belief vector associated with the kth word-cluster; and $c_{j,k}$ denotes an association strength value relating the jth word to the kth word-cluster.

10. The method of claim 2 wherein the observed feature vector is multidimensional, and each dimension of the observed feature vector is associated with a scalar, each scalar being binary valued.

11. The method of claim 10 wherein each dimension of the observed feature vector and the predicted feature vector indicates whether an associated word of the lexicon is present in the document.

12. The method of claim 11 wherein both the observed feature vector and the predicted feature vector each include as many dimensions as the second multiplicity of words in the lexicon.

13. The method of claim 11 wherein the step of generating the observed feature vector includes using a thresholding function for each dimension of the observed feature vector to determine the value of the scalar associated with the dimension.

14. The method of claim 13 wherein the thresholding function relates a number of times the word of the lexicon associated with the dimension occurs in the document compared to a knee of a word count histogram for the document.

15. The method of claim 2 wherein the topic belief vector is a multidimensional vector, each dimension of the topic belief vector representing a one of the first multiplicity of word-clusters, wherein each dimension is associated with a scalar having a value representative of an extent to which the associated word cluster is present in the document.

16. The method of claim 15 wherein step b) comprises setting each scalar associated with the topic belief vector to a number less than one.

17. The method of claim 11 wherein the number less than one is approximately 0.5.

* * * * *